United States Patent
Cardozo et al.

(10) Patent No.: US 12,300,013 B2
(45) Date of Patent: *May 13, 2025

(54) SYSTEMS AND METHODS FOR EXTRACTING AND PROCESSING DATA USING OPTICAL CHARACTER RECOGNITION IN REAL-TIME ENVIRONMENTS

(71) Applicant: Capital One Services, LLC, McLean, VA (US)

(72) Inventors: Kenneth Cardozo, Flower Mound, TX (US); Landon Nehmer, McKinney, TX (US); Esmat Zare, Frisco, TX (US); Mani Afsari, McKinney, TX (US); Jitender Jain, McKinney, TX (US); Venkateshwar Parpelli, Frisco, TX (US); Bhuvaneswari Balasubramanian, Frisco, TX (US); Bijun Du, Plano, TX (US); Daniel Nizinski, Plano, TX (US); Tausif Shahid, Celina, TX (US); Vijaya Kumar Pasam, Frisco, TX (US); Vikrant Khenat, Frisco, TX (US); Saira Zaman, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,247

(22) Filed: Jan. 31, 2024

(65) Prior Publication Data

US 2024/0169754 A1 May 23, 2024

Related U.S. Application Data

(63) Continuation of application No. 17/389,513, filed on Jul. 30, 2021, now Pat. No. 11,893,819.

(51) Int. Cl.
*G06V 30/416* (2022.01)
*G06N 3/08* (2023.01)
(Continued)

(52) U.S. Cl.
CPC ............. *G06V 30/416* (2022.01); *G06N 3/08* (2013.01); *G06N 5/01* (2023.01); *G06V 10/751* (2022.01);
(Continued)

(58) Field of Classification Search
CPC ........... G06V 30/416; G06V 30/19007; G06V 30/19013; G06V 10/751; G06N 3/08; G06N 5/01
See application file for complete search history.

(56) References Cited

U.S. PATENT DOCUMENTS

2014/0334731 A1* 11/2014 Tripathi ............... G06V 30/274 382/186
2020/0358611 A1* 11/2020 Hoang .................. H04L 9/3231
(Continued)

*Primary Examiner* — Daniel G Mariam
(74) *Attorney, Agent, or Firm* — Foley & Lardner LLP

(57) ABSTRACT

Methods and systems for extracting and processing data using optical character recognition in real-time environments. For example, the methods and systems provide novel techniques during extracting data using OCR and for a mechanism to process that data. These methods and systems are particularly relevant in real-time environments as the methods and system limit the need for manual review.

20 Claims, 6 Drawing Sheets

(51) Int. Cl.
  *G06N 5/01* (2023.01)
  *G06V 10/75* (2022.01)
  *G06V 30/19* (2022.01)
(52) U.S. Cl.
  CPC .. *G06V 30/19007* (2022.01); *G06V 30/19013* (2022.01)

(56) References Cited

U.S. PATENT DOCUMENTS

2022/0309516 A1\* 9/2022 Rhoads ................. G06N 20/00
2022/0366344 A1\* 11/2022 Shi ................... G06Q 10/06393

\* cited by examiner

200

202

204

206

Amount = $1,000
208

SYSTEMS AND METHODS FOR EXTRACTING AND PROCESSING DATA USING OPTICAL CHARACTER RECOGNITION IN REAL-TIME ENVIRONMENTS

CROSS-REFERENCE TO RELATED APPLICATIONS

This application is a continuation of U.S. patent application Ser. No. 17/389,513 filed Jul. 30, 2021. The content of the foregoing application is incorporated herein in its entirety by reference.

BACKGROUND

Optical Character Recognition ("OCR") is one form of artificial intelligence research. OCR technology is used in many fields, particularly to automatically extract data from one or more documents. However, conventional OCR techniques, and the systems that use them, still have problems extracting and processing data in real-time environments. For example, conventional OCR applications have particular trouble processing data from images with poor quality, alphabets with uncommon fonts (or in languages with detailed characters), mixtures of characters of different types (e.g., letters, numbers, punctuation, etc.), and documents with handwriting (especially cursive handwriting and/or signatures).

Accordingly, conventional OCR techniques still fall well below human accuracy levels when extracting and processing data. Due to this, conventional uses of OCR technology will be supplemented by human review of the extracted data. However, this lack of automation and the time required for manual review, causes conventional OCR techniques, and the systems that use them, to fail in real-time environments. This is particularly true for real-time applications in which accuracy of extraction is of importance.

SUMMARY

Methods and systems are described herein for extracting and processing data using optical character recognition in real-time environments. For example, the methods and systems provide novel techniques during extraction of data using OCR and for a mechanism to process that data. These methods and systems are particularly relevant in real-time environments as the methods and system limit the need for manual review. These methods and systems are also particularly relevant in environments featuring mixtures of characters of different types (e.g., letters, numbers, and/or punctuation) and in an unstructured format (both in terms of word disambiguation and section disambiguation of a document). These methods and systems are also particularly relevant in environments requiring particularly high levels of accuracy.

One illustrative embodiment in which a high degree of accuracy is required in a real-time environment would be the automatic verification of documents that support contemporaneous user submissions. For example, a user may submit personal information (e.g., social security number, address information, bank account information) that comprises a mixture of (e.g., letters, numbers, and/or punctuation). Additionally, the user may submit a plurality of documents (or documents of different types) such as pay stubs, utility receipts, bank statements, tax forms, etc., each of which may have information of different types, and/or information at different locations in the documents. Moreover, the documents may be of different sizes, shapes, and/or image quality. The methods and systems may receive the documents, extract the necessary information, and verify the user submissions.

However, processing these documents in a real-time environment with the necessary accuracy involves overcoming several technical hurdles. To account for this, the methods and systems include an additional preprocessing during the data extraction phase. Specifically, the system may gather submitted documents and encode them into text strings. Then, as opposed to performing conventional object recognition to identify a meaning of words and characters in the encoded text strings, the system may first receive target text strings (e.g., specific words, values, etc.) that should be found in the documents. These target strings are based on the user submissions requiring the verification (e.g., the social security number, address information, bank account information requiring verification). Using the target text strings, the system performs a comparison that more efficiently detects and extracts data from the documents and processes the extracted information. Furthermore, as the target text string is known, the system may select a processing algorithm that most efficiently and/or accurately is able to detect and/or extract it. During this extraction, the system may also extract metadata to classify the documents based on the comparisons. The extracted data is then sent to a rules processor workflow that completes the automatic verification.

In some aspects, methods and systems for automatically extracting and processing data using optical character recognition in real-time environments are described. For example, the system may receive, from a user submission, a value to be verified, wherein the user submission is based on a set of processing terms. The system may determine a target text string based on the value. The system may receive an image of a document, wherein the document comprises data for verifying the value. The system may parse the image to identify a plurality of text strings in the document. The system may compare each of the plurality of text strings to the target text string. The system may determine that a text string of the plurality of text strings corresponds to the target text string based on comparing each of the plurality of text strings to the target text string. The system may, in response to determining that the text string of the plurality of text strings corresponds to the target text string, validate the user submission. The system may, in response to validating the user submission, process the user submission to determine a first recommendation, wherein the first recommendation confirms the set of processing terms. The system may generate for display, in a user interface, the first recommendation.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
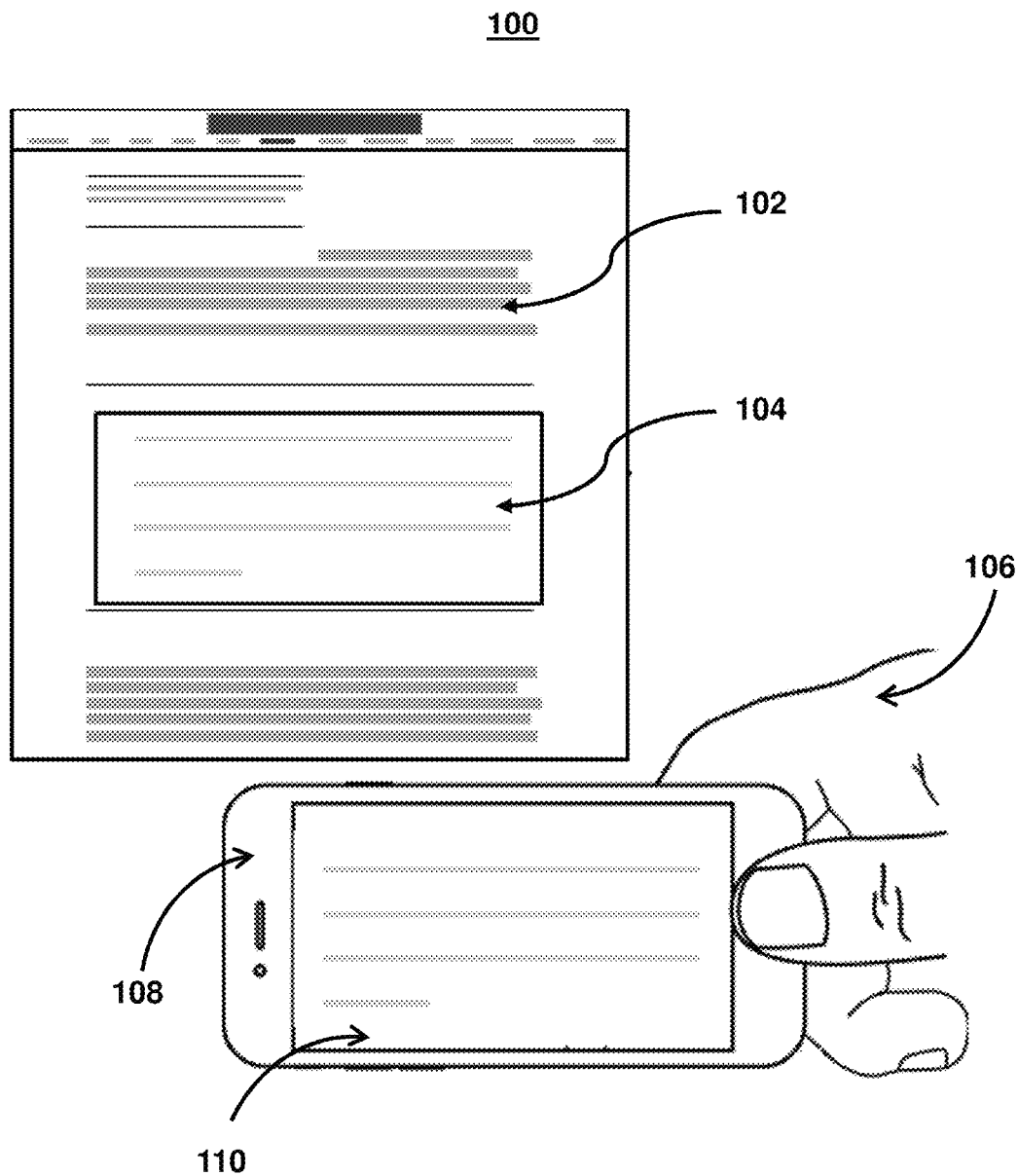
FIG. 1 shows an illustrative user interface for automatically extracting and processing data using optical character recognition in real-time environments, in accordance with one or more embodiments.

FIG. 1 shows an illustrative user interface for automatically extracting and processing data using optical character recognition in real-time environments, in accordance with one or more embodiments. For example, diagram 100 includes document 102. Document 102 also includes data 104. Data 104 is shown being captured by, and shown on (e.g., as data 110), device 108 as held by user 106.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "data" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Data may be recorded, played, displayed, or accessed by user equipment devices, but can also be part of a live performance. In some embodiments, data may include a text string. As described herein, a "text string" may include a group of characters that are used as data. Text strings may comprise of words, but may also include letters, numbers, special characters, the dash symbol, or the number sign. The system may parse a document for text strings.

Document 102 may include multiple sections. As referred to herein, a "section" may comprise any of the more or less distinct parts into which something the content may be divided or from which the content is made up. For example, a section may be distinguished from another section by one or more section characteristics. In diagram 100, the system may identify a section of the plurality of sections as having a section characteristic.

A section characteristic may comprise any characteristic that distinguishes one section from another. For example, a section characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, document 102 may include a section corresponding to data 104. For example, a user submission may include a plurality of fields in a structured submission template. The system may identify data 104 based on a paragraph, section break, and/or an HTML tag. The system may parse the section for a content characteristic (e.g., content characteristic) and metadata describing the content characteristic, wherein the metadata indicates a context of the content characteristic, and wherein the content characteristic comprises human-readable text. For example, as shown in diagram 100, the system may identify a content characteristic. As referred to herein, a "content characteristic" may comprise any of the more or less distinct parts into which something the section may be divided or from which the section is made up. For example, a content characteristic may be anything that may distinguish one content characteristic from another. In some embodiments, a content characteristic may be human-readable text. For example, the content characteristic may be a keyword, an image, an embedded object, etc.

The system may generate a content map for the section based on the parsing, wherein the content map indicates a position of the content characteristic in the section. For example, the content map may include each content characteristic of a given section with the distances and/or positions indicated. For example, the system may determine a CSS position property for each characteristic. In another example, the system may use HTML absolute positioning to define a content map. The system may use the content map to identify a field in the plurality of fields that constitutes the structured submission template.

Figure 2:
FIG. 2 shows an illustrative diagram for optical character recognition that is used to extract data, in accordance with one or more embodiments.
Figure 2:
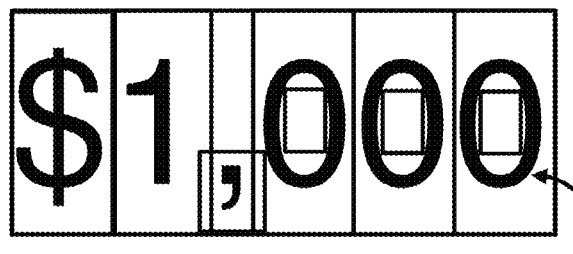
Figure 2:
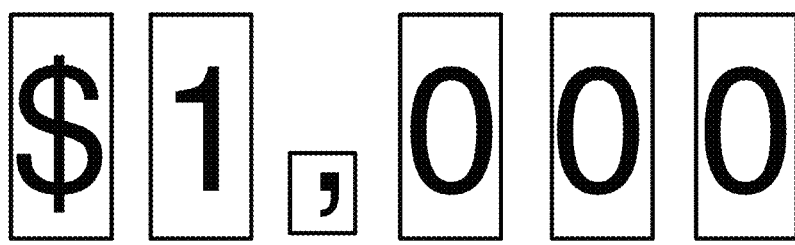
Figure 2:
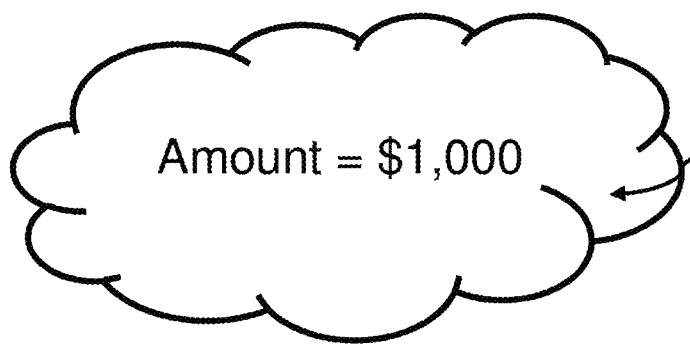

FIG. 2 shows an illustrative diagram for optical character recognition that is used to extract data, in accordance with one or more embodiments. For example, diagram 200 includes text string 202. Text string 202 may correspond to data included in a document (e.g., document 102 (FIG. 1)). Following a scan and/or upload of a document, the system may generate a scan and/or bitmap image of the document. For example, the system may encode the document into a series of text strings (e.g., a base 64 string). For example, the system may encode the document using binary-to-text encoding schemes that represent binary data (e.g., in an ASCII string format). It should also be noted that the system may perform a number of preliminary processing steps depending on the data, document, and/or verification type as well as to reduce noise. Smoothing implies both filling and thinning. For example, the system may perform a smoothing procedure on the image to eliminate small breaks, gaps and holes in digitized characters.

During processing, the system may first identify a text string in the series of text strings based on word contours in the image. For example, the system may identify text strings that correspond to individual words and/or numbers (e.g., the number "$1,000" in FIG. 2). For example, the word contours may comprise curves joining all the continuous points (along a boundary). For example, the system may receive text strings in semi-structured or unstructured data in various forms. In some embodiments, the system may identify particular word contours based on the type of value (or the value) needing to be identified. For example, as the system knows the target text strings (and the contours therein), the system may select a specific algorithm for doing so. For example, as shown in FIG. 2, the system may determine that the target text string corresponds to the number "$1,000". As such, the system may select an algorithm that is particularly accurate at detecting curvature (e.g., to distinguish the letter "O" from the number "0") as well as detecting punctuation such as a comma "," and/or symbols such as the dollar sign, "$".

The system may then identify character images in the image of the text string associated with the image of text string 202 based on character contours. The system may also apply a character naming convention for each character image. The system may then perform preprocessing on character images (e.g., character image 204) within the text string (e.g., text string 202) to identify individual characters (e.g., character 206).

The system may then compare text strings comprising the individual characters to target text strings. For example, as opposed to using a natural language processing algorithm to attempt to identify the meaning of the text strings, the system may compare the text strings comprising the individual characters to target text strings that are contained within a user submission.

As shown in FIG. 2, the system may have received a user submission that indicated a value for a given field corresponded to "$1,000." The system may have then received a document that is used to verify the veracity of the value indicated in the user submission. The system may set the value of the given field to be the target text string. By comparing the text string based on the identified individual characters to the target text string, the system more accurately determines whether or not the data in the document verifies the user submission.

Figure 3:
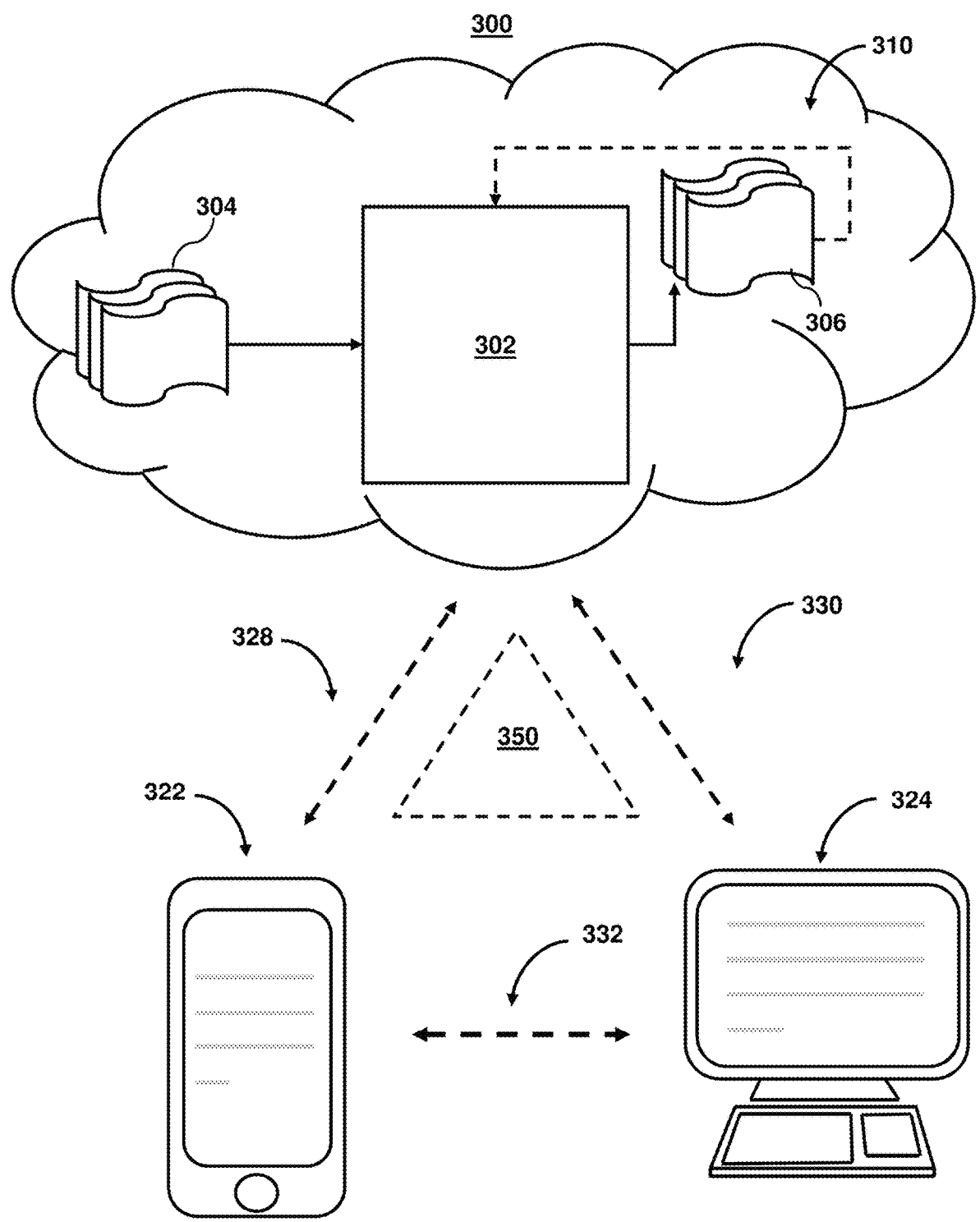
FIG. 3 shows illustrative system components for automatically extracting and processing data using optical character recognition in real-time environments, in accordance with one or more embodiments.

FIG. 3 shows illustrative system components for automatically extracting and processing data using optical character recognition in real-time environments, in accordance with one or more embodiments. For example, system 300 may represent the components used for generating dynamic conversational responses, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and cloud components 310 may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user intent).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions on a user's account. The output of the model (e.g., model 302) is only used to decide which location and/or delivery time offset to select.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use developer portal. API layer 350 may use strong security constraints applying WAF and DDoS protection, and API layer 350 may use RESTful APIs as standard for external integration.

Figure 4:
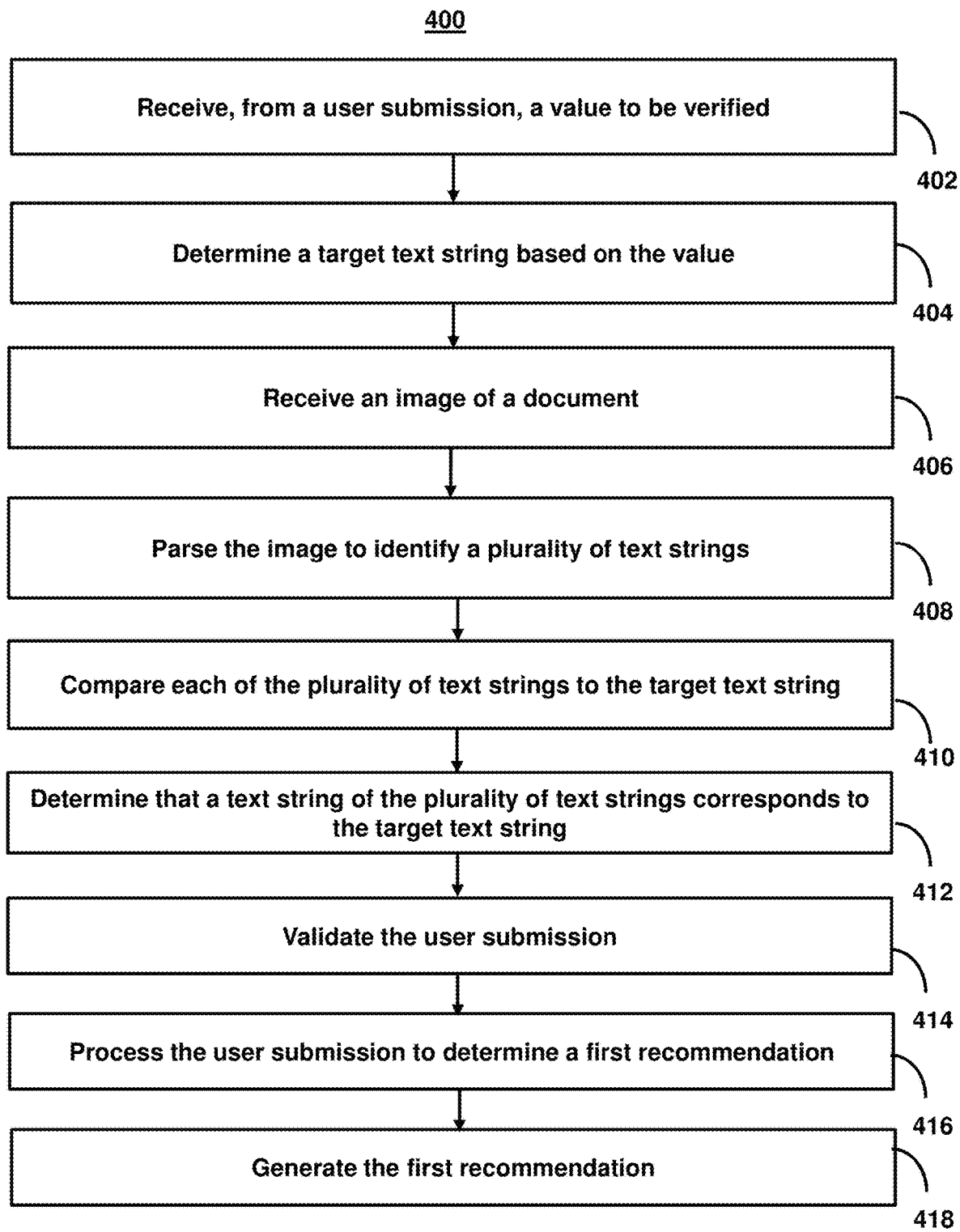
FIG. 4 shows a flowchart of the steps involved in automatically extracting and processing data using optical character recognition in real-time environments, in accordance with one or more embodiments.

FIG. 4 shows a flowchart of the steps involved in automatically extracting and processing data using optical character recognition in real-time environments, in accordance with one or more embodiments. For example, the system may use process 400 (e.g., as implemented on one or more system components shown in FIG. 3) in order to extract and process data in real-time environments. For example, the system may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique.

At step 402, process 400 (e.g., using one or more components described in system 300 (FIG. 3)) received, from a user submission, a value to be verified. For example, the system may receive, from a user submission, a value to be verified, wherein the user submission is based on a set of processing terms. For example, the system may receive multi-modal user data in response to a user interacting with a user interface, in response to a user request (e.g., a loan application), etc. For example, the multi-modal user data may comprise information about the user, user demographics, and/or one or more characteristics of a user, a user device, and/or one or more interactions of the user with a user device and/or application. The information may include a value (e.g., an annual income, age, name, address, etc.) that needs to be verified.

Additionally or alternatively, the system may perform one or more preprocessing tasks. For example, the system may generate an encoded version of the document in order to generate a secure version and/or a version that may be processed by the system. For example, the system may encode the document into the plurality of text strings to generate an encoded version of the document and process the encoded version using a cyber security protocol.

At step 404, process 400 (e.g., using one or more components described in system 300 (FIG. 3)) determines a target text string based on the value. For example, the system may determine a target text string based on the value (e.g., the target text may match the value). For example, the value to be verified may correspond to a particular value (e.g., "$1,000"). In response, the system may determine a target text string that also corresponds to "$1,000"). Alternatively or additionally, the system may perform one or more further determinations to determine the target text string based on the value. In such case, the system may select the one or more determinations based on one or more characteristics of the value, the document, the user, and/or other characteristics.

For example, in some embodiments, the value may correspond to a field of a plurality of fields in a structured submission template. Each field of the structured submission template (e.g., of a user submission) may comprise metadata characteristics that describes information for a value in that field. For example, the metadata may describe a unit of measure for the value. Additionally or alternatively, the system may determine a first unit of measure corresponding to the field (e.g., a monthly income of the user). The system may then determine a second unit of measure corresponding to a respective field of a document, wherein the document comprises data for verifying the value (e.g., the second unit of measure may correspond to an annual income of the user). The system may then determine a conversion metric for the target text string based on the first unit of measure and the second unit of measure. For example, the system may determine a conversion metric for converting an annual income into a monthly income. The system may then convert the value to the second unit of measure based on the conversion metric. Accordingly, the target text string may be set to a value similar, or based on, a value that needs to be verified, although the value is different.

Additionally, or alternatively, the system may determine the target text based on the value using fuzzy logic and/or another technique to detect similar text strings. For example, the system may use multiple types of optical character recognition and/or fuzzy logic, for example, when processing keyword(s) retrieved from data (e.g., textual data, translated audio data, user inputs, etc.) describing the value (or when cross-referencing various types of data in databases). For example, if the particular data received is textual data, using fuzzy logic, the system (e.g., via a content recognition module or algorithm incorporated into, or accessible by, the system) may determine two fields and/or values to be identical even though the substance of the data or value (e.g., two different spellings) is not identical. In some embodiments, the system may analyze particular received data of a data structure or media asset frame for particular values or text using optical character recognition methods described above in order to determine the value. Furthermore, the data could contain values (e.g., the data could be expressed in binary or any other suitable code or programming language).

As stated above, the system may perform one or more further determinations to determine the target text string based on the value. In such case, the system may select the one or more determinations based on one or more characteristics of the value, the document, the user, and/or other characteristics. In some embodiments, the system may retrieve these characteristics from a plurality of sources. For example, the system may receive data in the form of a video. The video may include a series of frames. For each frame of the video, the system may use a content recognition module or algorithm to determine the characteristics (including the actions associated with a user) in each of the frames or series of frames. Alternatively or additionally, for each frame of the video, the system may use a content recognition module or algorithm to determine the content of one or more frames of the video. The system may then compare the determined content to user preference information (e.g., retrieved from a user profile) to determine one or more characteristics of the user.

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the content of a user's comments. An audio component of the detection module may generate data indicating characteristics (e.g., by determining and processing keywords in the conversation).

At step 406, process 400 (e.g., using one or more components described in system 300 (FIG. 3)) receives an image of a document. For example, the system may receive an image of a document, wherein the document comprises data for verifying the value. For example, the system may receive a scan of a document (e.g., via an image capture device, as an attachment in an email, etc.).

At step 408, process 400 (e.g., using one or more components described in system 300 (FIG. 3)) parses the image to identify a plurality of text strings. For example, the system may parse the image to identify a plurality of text strings in the document. For example, the system may use a parsing algorithm that optimizes a posterior probability and outputs a scene representation as a parsing graph. The system may then parse detected sentences in speech and natural language as the algorithm constructs the parsing graph and re-configures it dynamically.

At step 410, process 400 (e.g., using one or more components described in system 300 (FIG. 3)) compares each of the plurality of text strings to the target text string. For example, the system may compare each of the plurality of text strings to the target text string to determine whether or not the target text string is present in the document.

At step 412, process 400 (e.g., using one or more components described in system 300 (FIG. 3)) determines that a text string of the plurality of text strings corresponds to the target text string. For example, the system may determine that a text string of the plurality of text strings corresponds to the target text string based on comparing each of the plurality of text strings to the target text string. In some embodiments, determining that the text string of the plurality of text strings corresponds to the target text string based on comparing each of the plurality of text strings to the target text string comprises comparing each of the plurality of text strings to the target text string using an artificial intelligence model, wherein the artificial intelligence model is trained to perform optical character recognition to determine matches between text strings parsed from images and inputted target text strings. For example, the system may use an artificial intelligence model to determine matches between text strings parsed from images and inputted target text strings.

At step 414, process 400 (e.g., using one or more components described in system 300 (FIG. 3)) validates the user submission. For example, the system may, in response to determining that the text string of the plurality of text strings corresponds to the target text string, validate the user submission. For example, the system may validate the user submission by determining that the value that needs to be verified is supported by the user submission.

At step 416, process 400 (e.g., using one or more components described in system 300 (FIG. 3)) processes the user submission to determine a first recommendation. For example, the system may, in response to validating the user submission, process the user submission to determine a first recommendation, wherein the first recommendation confirms the set of processing terms. For example, the set of processing terms may comprise terms for an agreement that is dependent on the value being verified. In response to validating the user submission (and thus verifying the value), the system may generate the first recommendation.

In some embodiments, the system may process the user submission by submitting the user submission to a rules processor workflow, wherein the rules processor workflow comprises a decision tree for evaluating the user submission. The system may then receive an output from the rules processor workflow, wherein the first recommendation is based on the output.

At step 418, process 400 (e.g., using one or more components described in system 300 (FIG. 3)) generates the first recommendation. For example, the system may generate for display, in a user interface (e.g., on user device 108 (FIG. 1)), the first recommendation. For example, the system may indicate that the user is approved for the set of processing terms that may comprise terms for an agreement.

The system may also generate one or more recommendations based on whether or not the plurality of text strings corresponds to the target text string. For example, in response to determining that none of the plurality of text strings corresponds to the target text string, the system may invalidate the user submission. In response to invalidating the user submission, the system may determine a second recommendation, wherein the second recommendation modifies a term of the set of processing terms. The system may then generate for display, in a user interface, the second recommendation. For example, the second recommendation may request additional information from the user and/or state that the set of processing terms require modification.

Additionally or alternatively, the system may generate a recommendation that requires additional documents (e.g., in order verify a value). For example, the system may, in response to determining that none of the plurality of text strings corresponds to the target text string, invalidate the user submission. In response to invalidating the user submission, the system may determine a third recommendation, wherein the third recommendation requests an additional document. The system may generate for display, in a user interface, the third recommendation.

Additionally or alternatively, the system may generate a recommendation that requires manual review of documents and/or user submissions. For example, the system may, in response to determining that none of the plurality of text strings corresponds to the target text string, invalidate the user submission. In response to invalidating the user submission, the system may determine a fourth recommendation, wherein the fourth recommendation requests a manual verification of the user submission. The system may generate for display, in a user interface, the fourth recommendation. In another example, the system may, in response to determining that none of the plurality of text strings corresponds to the target text string, invalidate the user submission. In response to invalidating the user submission, the system may determine a fifth recommendation, wherein the fifth recommendation requests a manual verification of the document. The system may generate for display, in a user interface, the fifth recommendation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-3 and 5-6 could be used to perform one or more of the steps in FIG. 4.

Figure 5:
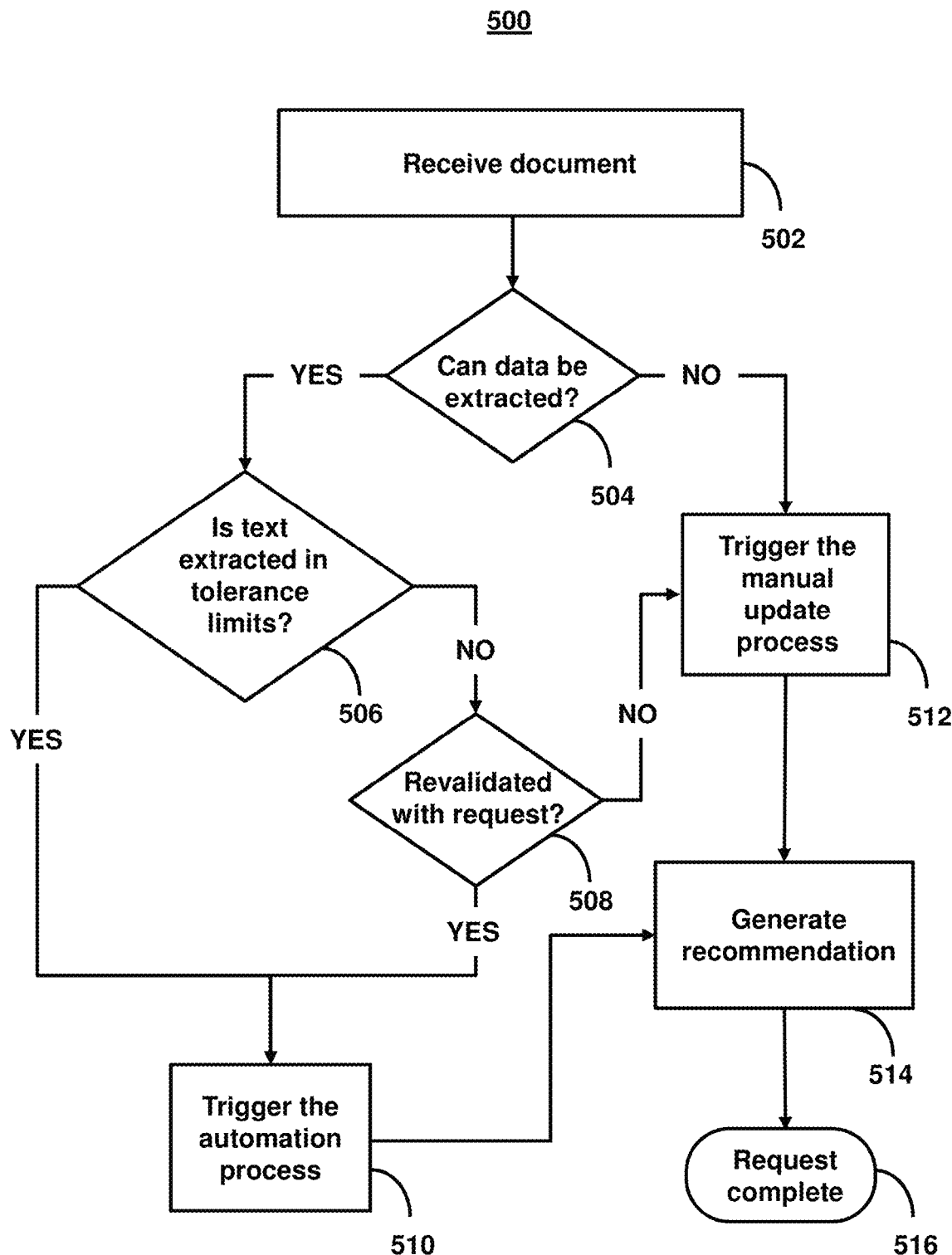
FIG. 5 shows a flowchart of the steps involved in extracting data in real-time environments, in accordance with one or more embodiments.

FIG. 5 shows a flowchart of the steps involved in extracting data in real-time environments, in accordance with one or more embodiments. For example, process 500 may comprise a rules processor workflow, wherein the rules processor workflow comprises a decision tree for evaluating the user submission. Based on the rules processor workflow, the system may receive an output, wherein the first recommendation is based on the output. For example, the system may include multiple components such as document OCR, autocompletion of a verification, and/or enhancement of the manual update process.

As step 502, process 500 (e.g., using one or more components described in system 300 (FIG. 3)) receives a document. For example, this may correspond to receiving a document in order to verify a value. In some embodiments, the system may perform a virus scan. If the virus scan is successful, the document is classified by the system based on type and sent for data extraction.

As step 504, process 500 (e.g., using one or more components described in system 300 (FIG. 3)) determines whether or not data can be extracted. For example, the system may determine if the data can be extracted. If it cannot be extracted, then the system may trigger the enhanced manual update process at step 512.

As step 506, process 500 (e.g., using one or more components described in system 300 (FIG. 3)) determines whether text (e.g., a target text string from a document) is extracted within tolerance limits. For example, the system may determine whether the value within the text is within a range of values and may verify the value. If not, the system may request a user to revalidate the request at step 508. If so, the system may automatically validate the value in the document at step 510 and generate a recommendation at step 514 before ending the process at step 516.

For example, in some embodiments, the system may verify the income of a user. In such cases, if the data can be extracted then the income details are extracted. The system may then calculate the income using various available income calculator tools. If the income is not in the tolerance levels, the system may then trigger a notification for a manual intervention from a user. After the income has been calculated by the system the proof-of-income Automation Process is triggered which will autocomplete the income verification task as shown in FIG. 6.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-4 and 6 could be used to perform one or more of the steps in FIG. 5.

Figure 6:
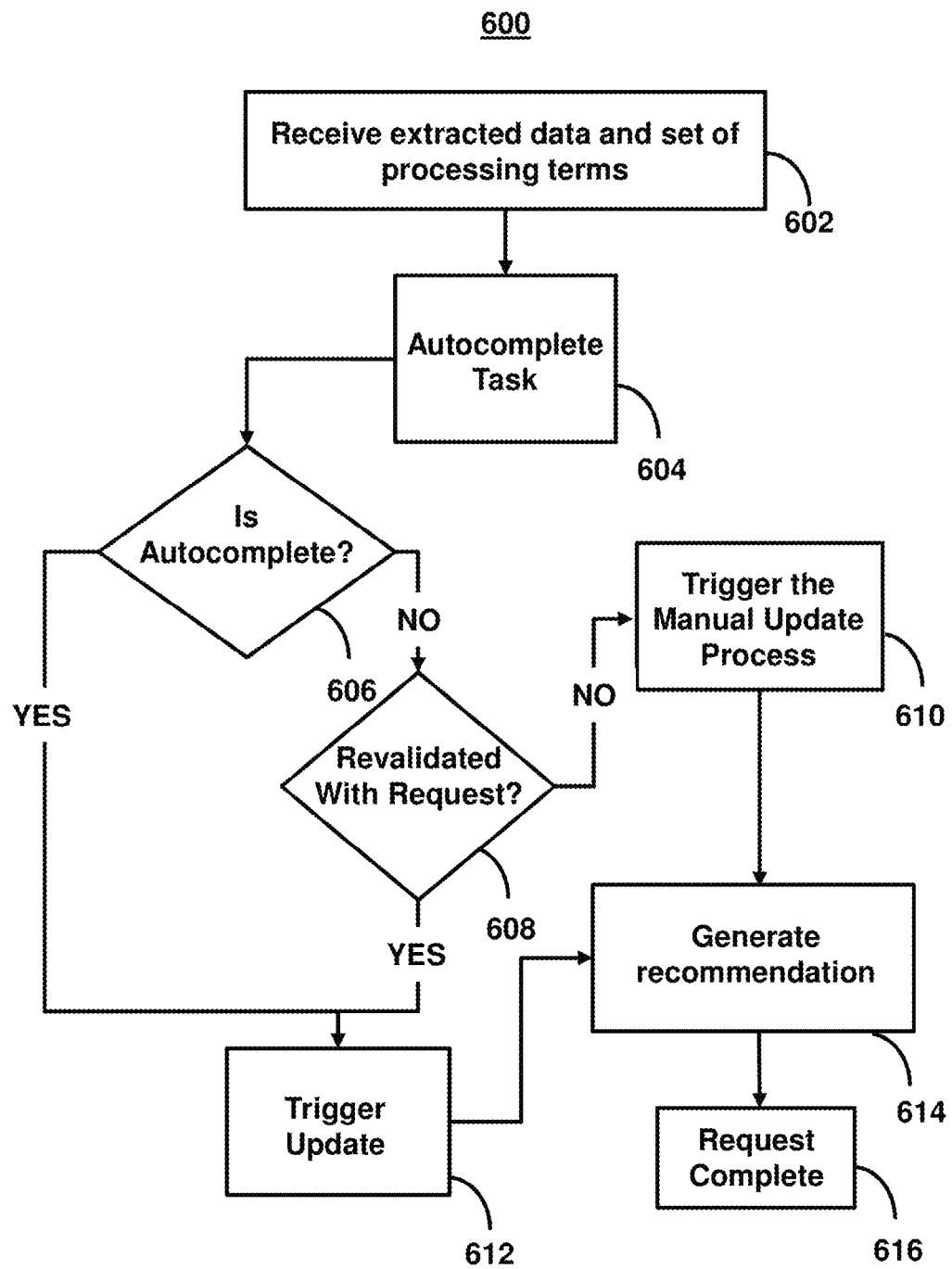
FIG. 6 shows a flowchart of the steps involved in processing data in real-time environments, in accordance with one or more embodiments.

FIG. 6 shows a flowchart of the steps involved in processing data in real-time environments, in accordance with one or more embodiments. For example, process 600 may comprise a rules processor workflow, wherein the rules processor workflow comprises a decision tree for evaluating the user submission. Based on the rules processor workflow, the system may receive an output, wherein the first recommendation is based on the output. For example, the system may include multiple components such as document OCR, autocompletion of a verification, and/or enhancement of the manual update process.

At step 602, process 600 (e.g., using one or more components described in system 300 (FIG. 3)) receives extracted data and a set of processing terms. For example, the system may receive extracted text (e.g., corresponding to a target text string and a set of processing terms). At step 604, process 600 (e.g., using one or more components described in system 300 (FIG. 3)) performs an autocomplete task (e.g., automatically validating the user submission). At step 606, if the autocomplete is successful (e.g., the document text is automatically verified), process 600 determines whether the data has been revalidated with a request. If process 600 determines that the data has been revalidated with the request, process 600 proceeds to trigger an update at step 612 and generate a recommendation at step 614. If process 600 determines that the data has not been revalidated with the request, process 600 triggers the manual update process at step 610 and generates a recommendation at step 614 before ending the process at step 616.

For example, in an example involving income verification, the system may update the income which is extracted from the document OCR process as well as the processing terms (e.g., the deal structure of an arrangement). The system may gather all the details of the deal to make the update. For example, this involves retrieving all the details of the applicant, application, contract and vehicle info. After the processing terms have been updated then the proof of income task can be auto completed. If at any point there is an issue with updating the deal structure or auto completing the income, the system may trigger an enhanced manual update process.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-5 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for automatically extracting and processing data using optical character recognition in real-time environments, the method comprising: receiving, from a user submission, a value to be verified, wherein the user submission is based on a set of processing terms; determining a target text string based on the value; receiving an image of a document, wherein the document comprises data for verifying the value; parsing the image to identify a plurality of text strings in the document; comparing each of the plurality of text strings to the target text string; determining that a text string of the plurality of text strings corresponds to the target text string based on comparing each of the plurality of text strings to the target text string; in response to determining that the text string of the plurality of text strings corresponds to the target text string, validating the user submission; in response to validating the user submission, processing the user submission to determine a first recommendation, wherein the first recommendation confirms the set of processing terms; and generating for display, in a user interface, the first recommendation.

2. The method of any one of the preceding embodiments, further comprising: in response to determining that none of the plurality of text strings corresponds to the target text string, invalidating the user submission; in response to invalidating the user submission, determining a second recommendation, wherein the second recommendation modifies a term of the set of processing terms; and generating for display, in a user interface, the second recommendation.

3. The method of any one of the preceding embodiments, further comprising: in response to determining that none of the plurality of text strings corresponds to the target text string, invalidating the user submission; in response to invalidating the user submission, determining a third recommendation, wherein the third recommendation requests an additional document; and generating for display, in a user interface, the third recommendation.

4. The method of any one of the preceding embodiments, further comprising: in response to determining that none of the plurality of text strings corresponds to the target text string, invalidating the user submission; in response to invalidating the user submission, determining a fourth recommendation, wherein the fourth recommendation requests a manual verification of the user submission; and generating for display, in a user interface, the fourth recommendation.

5. The method of any one of the preceding embodiments, further comprising: in response to determining that none of the plurality of text strings corresponds to the target text string, invalidating the user submission;
in response to invalidating the user submission, determining a fifth recommendation, wherein the fifth recommendation requests a manual verification of the document; and generating for display, in a user interface, the fifth recommendation.

6. The method of any one of the preceding embodiments, wherein determining that the text string of the plurality of text strings corresponds to the target text string based on comparing each of the plurality of text strings to the target text string comprises comparing each of the plurality of text strings to the target text string using an artificial intelligence model, wherein the artificial intelligence model is trained to perform optical character recognition to determine matches between text strings parsed from images and inputted target text strings.

7. The method of any one of the preceding embodiments, wherein processing the user submission further comprises: submitting the user submission to a rules processor workflow, wherein the rules processor workflow comprises a decision tree for evaluating the user submission; and receiving an output from the rules processor workflow, wherein the first recommendation is based on the output.

8. The method of any one of the preceding embodiments, wherein the value corresponds to a field of a plurality of fields in a structured submission template.

9. The method of any one of the preceding embodiments, wherein determining the target text string based on the value further comprises: determining a first unit of measure corresponding to the field; determining a second unit of measure corresponding to a respective field of a document, wherein the document comprises data for verifying the value; determining a conversion metric for the target text string based on the first unit of measure and the second unit of measure; and converting the value to the second unit of measure based on the conversion metric.

10. The method of any one of the preceding embodiments, further comprising: encoding the document into the plurality of text strings to generate an encoded version of the document; and processing the encoded version using a cyber security protocol.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for automatically extracting and processing data using optical character recognition in real-time environments, the system comprising:
cloud-based storage circuitry configured to store an artificial intelligence model, wherein the artificial intelligence model is trained to perform optical character recognition;
cloud-based control circuitry configured to:
receive, from a user submission, a value to be verified, wherein the value corresponds to a field of a plurality of fields in a structured submission template, and wherein the user submission is based on a set of processing terms;
determine a target text string based on the value, wherein determining the target text string based on the value further comprises:
determining a first unit of measure corresponding to the field;
determining a second unit of measure corresponding to a respective field of a document, wherein the document comprises data for verifying the value;
determining a conversion metric for the target text string based on the first unit of measure and the second unit of measure; and
converting the value to the second unit of measure based on the conversion metric;

parse content to identify a plurality of text strings;

compare each of the plurality of text strings to the target text string;

determine that a text string of the plurality of text strings corresponds to the target text string based on comparing, using the artificial intelligence model, each of the plurality of text strings to the target text string;

in response to determining that the text string of the plurality of text strings corresponds to the target text string, validating the user submission; and in response to validating the user submission, processing the user submission to determine a recommendation based on the user submission;

cloud-based input/output circuitry configured to generate for display, in a user interface, the recommendation.

2. A method for automatically extracting and processing data using optical character recognition in real-time environments, the method comprising:

receiving, from a user submission, a value to be verified, wherein the user submission is based on a set of processing terms;

determining a target text string based on the value;

receiving content for verifying the value;

parsing the content to identify a plurality of text strings;

comparing each of the plurality of text strings to the target text string;

determining that a text string of the plurality of text strings corresponds to the target text string based on comparing each of the plurality of text strings to the target text string;

in response to determining that the text string of the plurality of text strings corresponds to the target text string, validating the user submission; and in response to validating the user submission, processing the user submission to confirm the set of processing terms.

3. The method of claim 2, further comprising:

in response to determining that none of the plurality of text strings corresponds to the target text string, invalidating the user submission;

in response to invalidating the user submission, determining a second recommendation, wherein the second recommendation modifies a term of the set of processing terms; and generating for display, in a user interface, the second recommendation.

4. The method of claim 2, further comprising:

in response to determining that none of the plurality of text strings corresponds to the target text string, invalidating the user submission;

in response to invalidating the user submission, determining a third recommendation, wherein the third recommendation requests an additional document; and generating for display, in a user interface, the third recommendation.

5. The method of claim 2, further comprising:

in response to determining that none of the plurality of text strings corresponds to the target text string, invalidating the user submission;

in response to invalidating the user submission, determining a fourth recommendation, wherein the fourth recommendation requests a manual verification of the user submission; and generating for display, in a user interface, the fourth recommendation.

6. The method of claim 2, further comprising:

in response to determining that none of the plurality of text strings corresponds to the target text string, invalidating the user submission;

in response to invalidating the user submission, determining a fifth recommendation, wherein the fifth recommendation requests a manual verification of the content; and generating for display, in a user interface, the fifth recommendation.

7. The method of claim 2, wherein determining that the text string of the plurality of text strings corresponds to the target text string based on comparing each of the plurality of text strings to the target text string comprises comparing each of the plurality of text strings to the target text string using an artificial intelligence model, wherein the artificial intelligence model is trained to perform optical character recognition.

8. The method of claim 2, wherein processing the user submission further comprises:

submitting the user submission to a rules processor workflow, wherein the rules processor workflow comprises a decision tree for evaluating the user submission; and receiving an output from the rules processor workflow.

9. The method of claim 2, wherein the value corresponds to a field of a plurality of fields in a structured submission template.

10. The method of claim 9, wherein determining the target text string based on the value further comprises:

determining a first unit of measure corresponding to the field;

determining a second unit of measure corresponding to a respective field of a document, wherein the document comprises data for verifying the value;

determining a conversion metric for the target text string based on the first unit of measure and the second unit of measure; and converting the value to the second unit of measure based on the conversion metric.

11. The method of claim 2, further comprising:

encoding the content into the plurality of text strings to generate an encoded version of the content; and processing the encoded version using a cyber security protocol.

12. One or more non-transitory, computer readable media comprising instructions that, when executed by one or more processors, cause operations comprising:

receiving, from a user submission, a value to be verified, wherein the user submission is based on a set of processing terms;

determining a target text string based on the value;

receiving content for verifying the value;

parsing the content to identify a text string in the content;

comparing the text string to the target text string;

determining that the text string corresponds to the target text string;

in response to determining that the text string corresponds to the target text string, validating the user submission; and in response to validating the user submission, processing the user submission to confirm the set of processing terms.

13. The one or more non-transitory, computer readable media of claim 12, wherein the instructions further cause operations comprising:

in response to determining that the text string does not correspond to the target text string, invalidating the user submission;

in response to invalidating the user submission, determining a second recommendation, wherein the second recommendation modifies a term of the set of processing terms; and generating for display, in a user interface, the second recommendation.

14. The one or more non-transitory, computer readable media of claim 12, wherein the instructions further cause operations comprising:

in response to determining that the text string does not correspond to the target text string, invalidating the user submission;

in response to invalidating the user submission, determining a third recommendation, wherein the third recommendation requests an additional document; and generating for display, in a user interface, the third recommendation.

15. The one or more non-transitory, computer readable media of claim 12, wherein the instructions further cause operations comprising:

in response to determining that the text string does not correspond to the target text string, invalidating the user submission;

in response to invalidating the user submission, determining a fourth recommendation, wherein the fourth recommendation requests a manual verification of the user submission; and generating for display, in a user interface, the fourth recommendation.

16. The one or more non-transitory, computer readable media of claim 12, wherein the instructions further cause operations comprising:

in response to determining that the text string does not correspond to the target text string, invalidating the user submission;

in response to invalidating the user submission, determining a fifth recommendation, wherein the fifth recommendation requests a manual verification of the content; and generating for display, in a user interface, the fifth recommendation.

17. The one or more non-transitory, computer readable media of claim 12, wherein determining that the text string corresponds to the target text string is based on using an artificial intelligence model, wherein the artificial intelligence model is trained to perform optical character recognition.

18. The one or more non-transitory, computer readable media of claim 12, wherein processing the user submission further comprises:

submitting the user submission to a rules processor workflow, wherein the rules processor workflow comprises a decision tree for evaluating the user submission; and receiving an output from the rules processor workflow.

19. The one or more non-transitory, computer readable media of claim 12, wherein the value corresponds to a field of a plurality of fields in a structured submission template, and wherein determining the target text string based on the value further comprises:

determining a first unit of measure corresponding to the field;

determining a second unit of measure corresponding to a respective field of a document, wherein the document comprises data for verifying the value;

determining a conversion metric for the target text string based on the first unit of measure and the second unit of measure; and converting the value to the second unit of measure based on the conversion metric.

20. The one or more non-transitory, computer readable media of claim 12, wherein the instructions further cause operations comprising:

encoding the content to generate an encoded version of the content; and processing the encoded version using a cyber security protocol.

* * * * *